(12) United States Patent
Watanabe et al.

(10) Patent No.: US 6,880,680 B2
(45) Date of Patent: Apr. 19, 2005

(54) ELECTRICALLY ACTUATABLE DISC BRAKE

(75) Inventors: Jun Watanabe, Yamanashi (JP); Yukio Ohtani, Kanagawa (JP)

(73) Assignee: Tokico, Ltd., Kanagawa-ken (JP)

( * ) Notice: Subject to any disclaimer, the term of this patent is extended or adjusted under 35 U.S.C. 154(b) by 0 days.

(21) Appl. No.: 10/372,952

(22) Filed: Feb. 26, 2003

(65) Prior Publication Data

US 2004/0035654 A1 Feb. 26, 2004

(30) Foreign Application Priority Data

Feb. 28, 2002 (JP) ........................................ 2002-054584
Mar. 29, 2002 (JP) ........................................ 2002-096131

(51) Int. Cl.[7] .............................................. F16D 55/08
(52) U.S. Cl. ................................... 188/72.8; 188/156
(58) Field of Search ............................. 188/72.1, 72.2, 188/72.7, 72.8, 156, 157, 158, 161, 162; 475/162, 169, 170

(56) References Cited

U.S. PATENT DOCUMENTS 1,563,945 A * 12/1925 Apple ......................... 475/149
2,881,619 A * 4/1959 Fox et al. ................... 475/149

FOREIGN PATENT DOCUMENTS

JP 03045462 A * 2/1991 .......... B60T/13/74
WO 00/60255 10/2000

* cited by examiner

Primary Examiner—Thomas Williams
(74) Attorney, Agent, or Firm—Wenderoth, Lind & Ponack, L.L.P.

(57) ABSTRACT

In an electrically actuatable disc brake, rotation of a rotor of an electric motor is reduced by means of a differential reduction mechanism. A ball ramp mechanism is operated to press brake pads against a disc rotor to generate a braking force. In the differential reduction mechanism, when an eccentric shaft of the rotor is subjected to eccentric rotation, an external gear member having external input teeth meshing with a fixed ring gear performs an orbital motion while rotating on a center axis of the gear member, whereby a set of external output teeth of the gear member performs an orbital motion while rotating on the center axis to operate a ring gear integrally formed with a rotary disc of the ball ramp mechanism. A high reduction ratio can be easily obtained. The differential reduction mechanism can be easily formed and imparted with sufficient strength.

15 Claims, 8 Drawing Sheets

ELECTRICALLY ACTUATABLE DISC BRAKE

BACKGROUND OF THE INVENTION

1. Field of the Invention

The present invention relates to an electrically actuatable disc brake that is capable of converting a rotary motion of an electric motor to a linear motion so as to press brake pads against a disc rotor to thereby generate a braking force.

2. Description of the Related Art

Conventionally, there has been known an electrically actuatable disc brake apparatus in which a rotary motion of an electric motor is converted to a linear motion of a piston by using a rotary-linear motion converting mechanism such as a ball screw mechanism, a ball ramp mechanism, etc., so as to allow the piston to press brake pads against a disc rotor to thereby generate a braking force. In the electrically actuatable disc brake, a driver's pedaling force that is applied to a brake pedal (or an amount of displacement of the brake pedal) is detected by a sensor and, based on the detected value, a controller controls the rotation of the electric motor to thereby obtain a desired braking force.

In order to amplify torque of an electric motor of an electrically actuatable disc brake, various proposals have been made with respect to an electrically actuatable disc brake in which a reduction mechanism is provided between an electric motor and a rotary-linear motion converting mechanism. For example, Unexamined Japanese Patent Application Public Disclosure No. 2001-263395 describes an electrically actuatable disc brake comprising a differential reduction mechanism in which planetary gears and an Oldham mechanism are used in combination.

In this electrically actuatable disc brake, the differential reduction mechanism is arranged such that an eccentric plate is rotatably attached to an eccentric shaft that is connected to a rotor of a motor, fixed pins are inserted through openings formed in the eccentric plate, and external teeth of the eccentric plate are meshed with internal teeth of a rotary disc of a ball ramp mechanism. With this arrangement, when the eccentric shaft is rotated, the eccentric plate performs an orbital motion without rotating on its center axis, thereby operating the rotary disc of the ball ramp mechanism at a predetermined reduction ratio.

The aforementioned Japanese patent application also describes a differential reduction mechanism comprising a cycloid ball mechanism and an Oldham mechanism using annular grooves and balls. This differential reduction mechanism exerts the same working effects as the above-described differential reduction mechanism.

However, the electrically actuatable disc brake described in the aforementioned patent application has the following problems. That is, the eccentric plate and pins forming the Oldham mechanism are costly to manufacture due to the need to achieve high machining accuracy. Further, although high strength is required to withstand a high load during braking, it is difficult to increase the strength of the Oldham mechanism due to its structure.

Similarly, in the differential reduction mechanism comprising a cycloid ball mechanism and an Oldham mechanism, high machining accuracy is required. In particular, the requirements for axial dimensional accuracy are especially strict, which involves problems in practical terms.

The present invention has been made in view of the above-described problems with the conventional apparatuses. It is therefore an object of the present invention to provide an electrically actuatable disc brake comprising a reduction mechanism having a simple structure and sufficient strength and which is capable of providing a desired reduction ratio.

SUMMARY OF THE INVENTION

In order to achieve the above-mentioned object, the present invention provides an electrically actuatable disc brake which comprises an electric motor, a reduction mechanism for reducing the rotation of a rotor of the electric motor and a converting mechanism for converting the rotation provided by the reduction mechanism to a linear motion, whereby brake pads are pressed against a disc rotor by means of the converting mechanism to thereby generate a braking force. The reduction mechanism comprises an eccentric shaft that is connected to the rotor of the motor, a gear member that is rotatably attached to the eccentric shaft and including a set of external input teeth and a set of output teeth adapted to rotate unitarily with each other, a fixed ring gear having internal teeth adapted to mesh with the external input teeth, and a ring gear that is adapted to mesh with the output teeth and to operate the converting mechanism.

With this arrangement, when the eccentric shaft is subject to eccentric rotation, the set of external input teeth meshed with the fixed ring gear, that is, the gear member, performs an orbital motion. Due to this orbital motion of the gear member, the set of output teeth operates the ring gear, thereby creating a differential movement between the rotor of the motor and the ring gear and achieving a predetermined reduction ratio.

In one embodiment of the present invention, the number of teeth of the set of external input teeth and the number of teeth of the fixed ring gear are equal.

With this arrangement, the set of external input teeth and the fixed ring gear operate as an Oldham mechanism, and the gear member performs an orbital motion without rotating on the center axis of the gear member.

In another embodiment of the present invention, the set of output teeth comprises external teeth.

With this arrangement, the gear member has no internal teeth. Therefore, the gear member can be easily formed and imparted with a small diameter.

In a further embodiment of the present invention, the number of teeth of the set of external input teeth and the number of teeth of the set of output teeth are equal.

With this arrangement, the external input teeth and the output teeth of the gear member can be formed integrally with each other at the same time.

DETAILED DESCRIPTION OF THE INVENTION

Hereinbelow, with reference to the drawings, a detailed description of an embodiment of the present invention is now presented.

Figure 1:
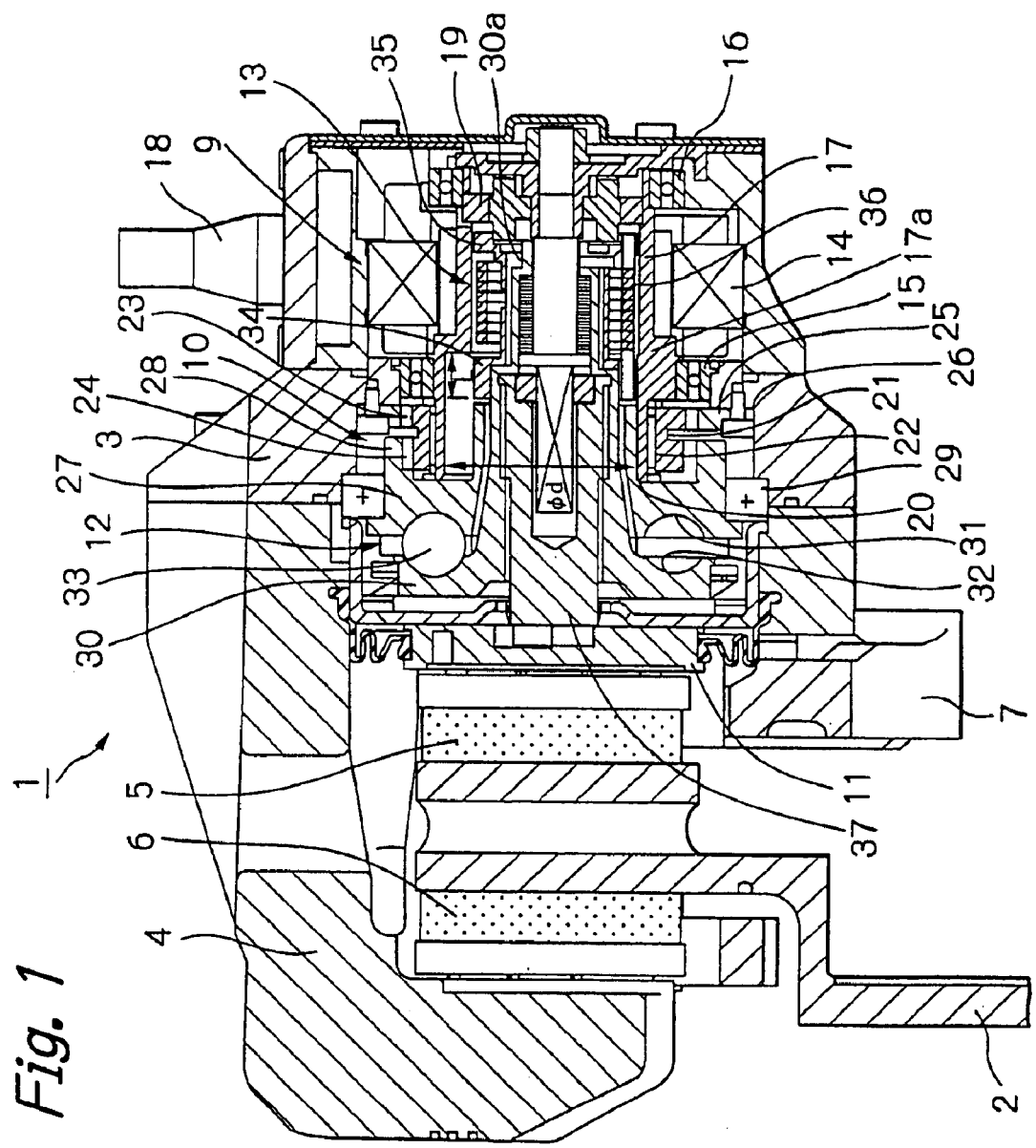
FIG. 1 is a vertical cross-sectional view of an electrically actuatable disc brake according to an embodiment of the present invention.
Figure 2:
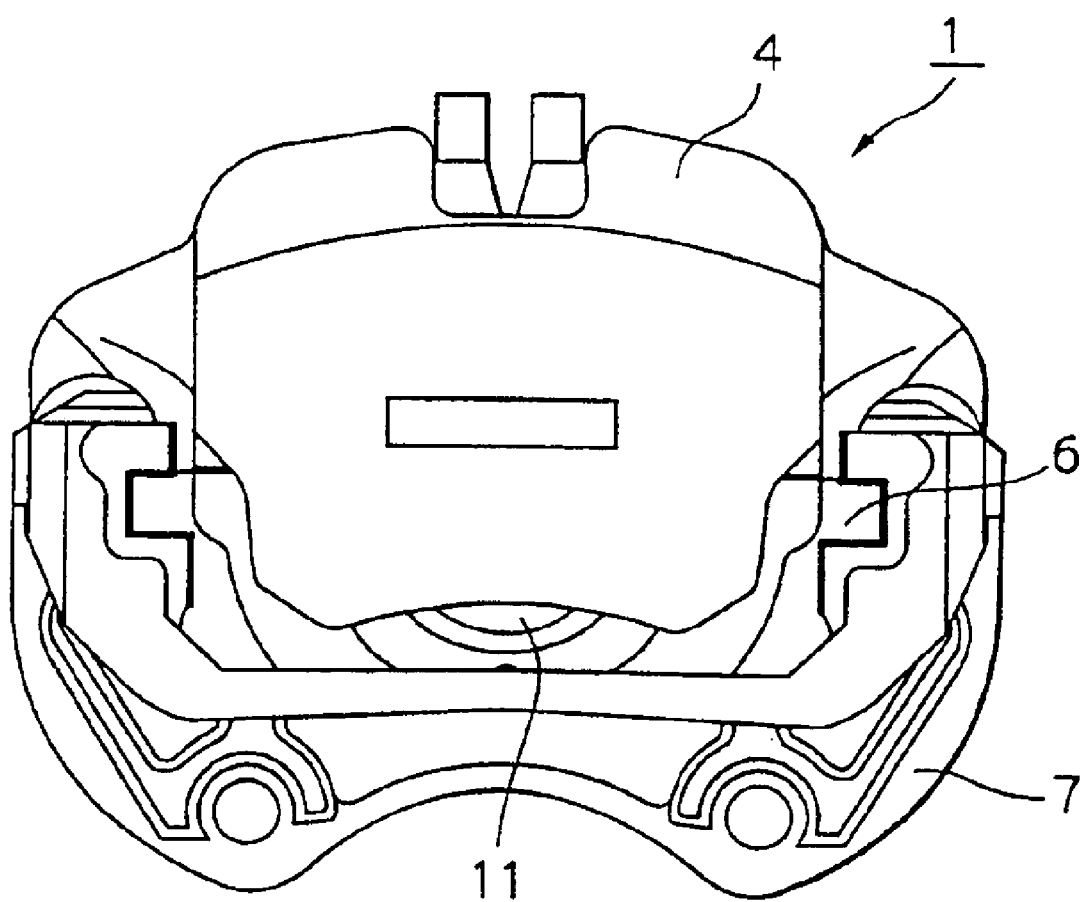
FIG. 2 is a front view of the electrically actuatable disc brake of FIG. 1.
Figure 3:
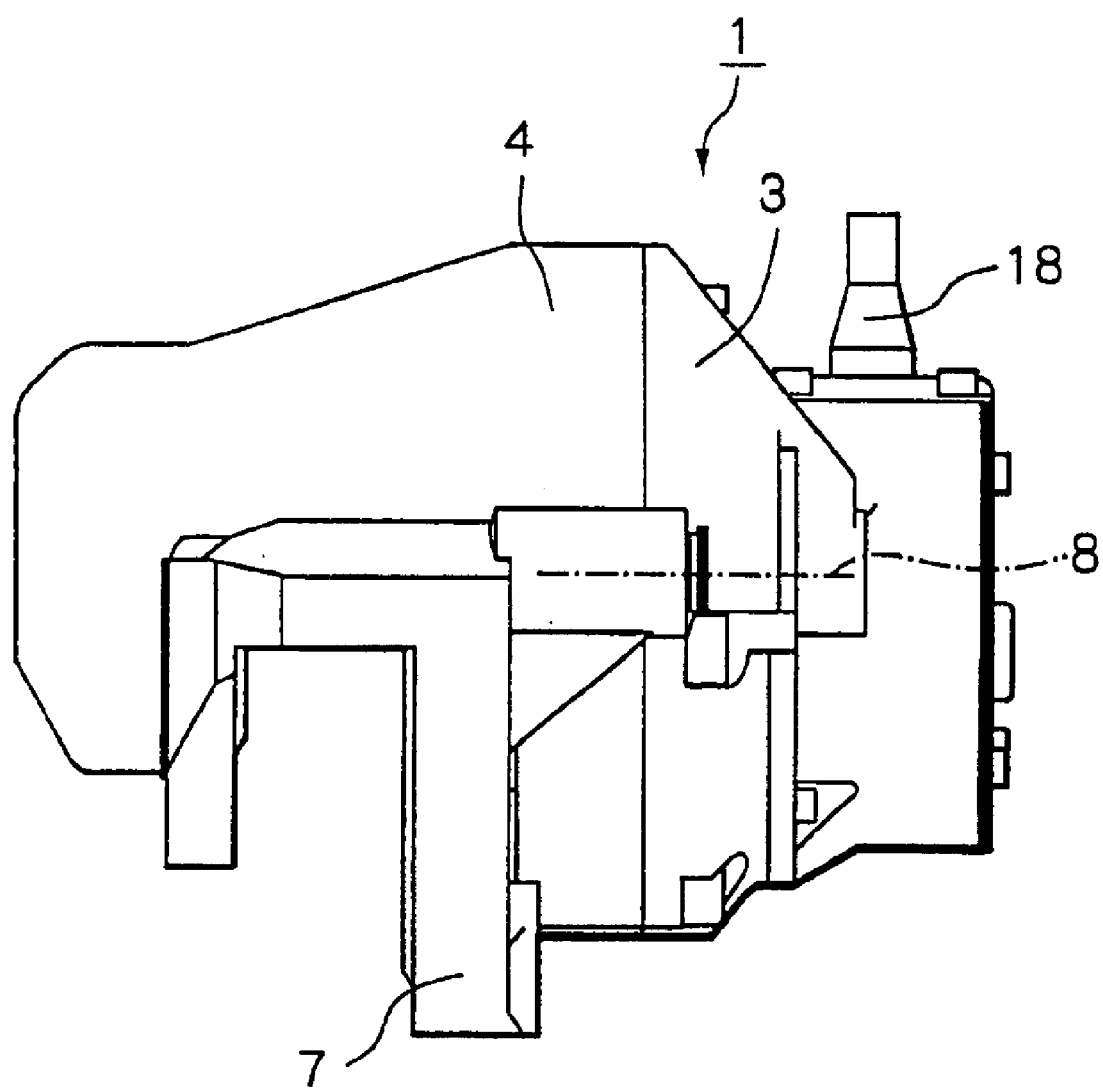
FIG. 3 is a side view of the electrically actuatable disc brake of FIG. 1.
Figure 4:
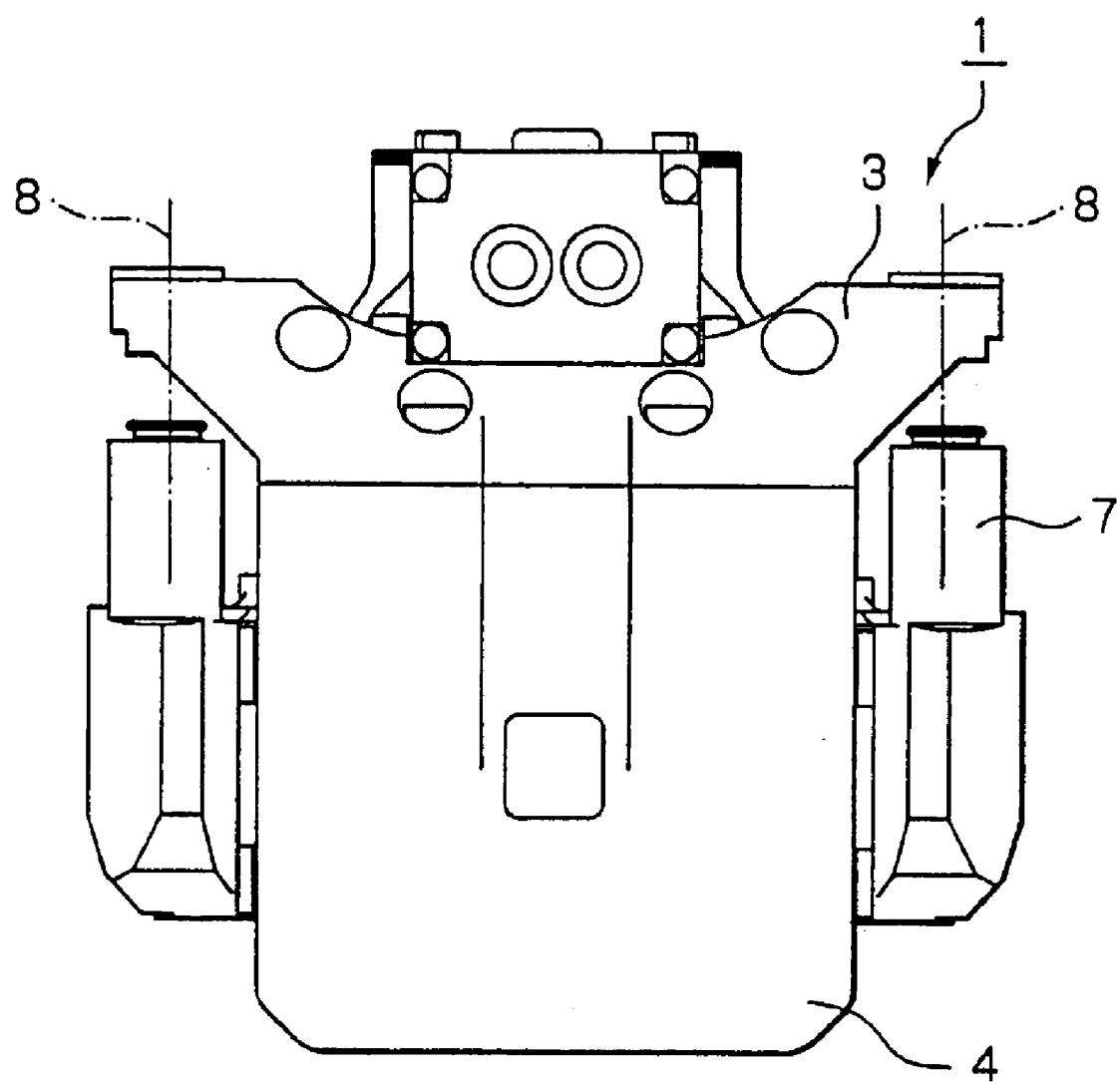
FIG. 4 is a plan view of the electrically actuatable disc brake of FIG. 1.
Figure 5:
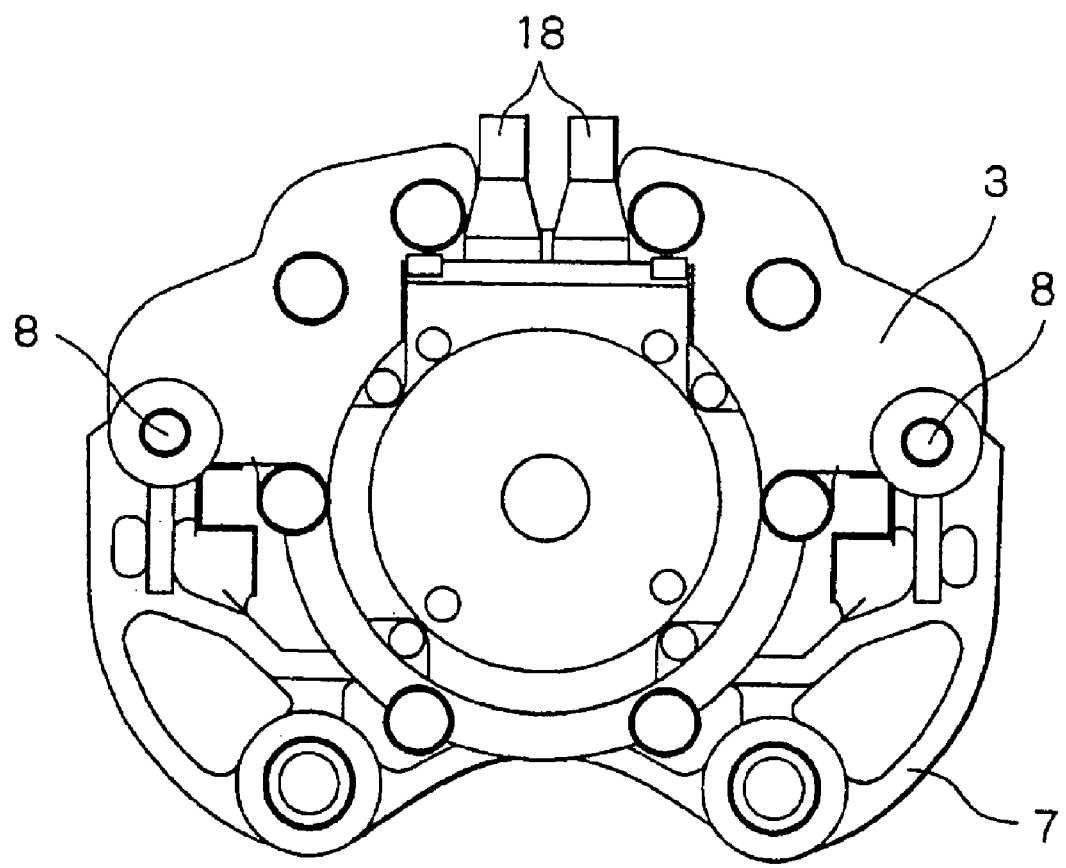
FIG. 5 is a rear view of the electrically actuatable disc brake of FIG. 1.

As shown in FIGS. 1 to 5, in an electrically actuatable disc brake 1, a caliper body 3 is disposed on one side (generally, an inner side that is relative to a vehicle body) of a disk rotor 2 which is capable of rotating with a wheel (not shown). The caliper body 3 is connected integrally to a generally C-shaped claw portion 4 extending over the disc rotor 2 towards the other side of the disc rotor 2. Brake pads 5 and 6 are disposed on opposite sides of the disc rotor 2, that is, between the disc rotor 2 and the caliper body 3 and between the disc rotor 2 and a distal end portion of the claw portion 4, respectively. The brake pads 5 and 6 are supported by a carrier 7 that is fixed relative to the vehicle body, such that the brake pads 5 and 6 are movable in an axial direction of the disc rotor 2 and braking torque is received by the carrier 7. Slide pins 8, which are attached to the caliper body 3, are slidably provided in the carrier 7. The caliper body 3 is guided by means of the slide pins 8 (the center axis of the slide pin 8 is shown in FIG. 3) so that the caliper body 3 is capable of a sliding movement in the axial direction of the disc rotor 2.

In the caliper body 3, there is provided an electric motor 9, a differential reduction mechanism 10 (a reduction mechanism) for reducing the rotation of the electric motor 9, a ball ramp mechanism 12 (a converting mechanism) for converting the rotation of the electric motor 9 to a linear motion after a speed-reduction by the differential reduction mechanism 10 to thereby effect a reciprocal movement of a piston 11 which abuts against the brake pad 5, and a pad wear compensation mechanism 13 for adjusting a position of the piston 11 according to the degree of wear of the brake pads 5 and 6.

The electric motor 9 comprises a stator 14 that is fixed to the caliper body 3 and a rotor 17 having a hollow structure. The rotor 17 is rotatably supported by the caliper body 3 through bearings 15 and 16. The rotor 17 is rotated in accordance with a driving voltage from a controller (not shown) that is connected through a connector 18 to the electric motor 9. An angular position of the rotor 17 is detected by a resolver 19 that is attached to the rotor 17, and thus, the rotor 17 can be rotated through a desired angle.

Figure 6:
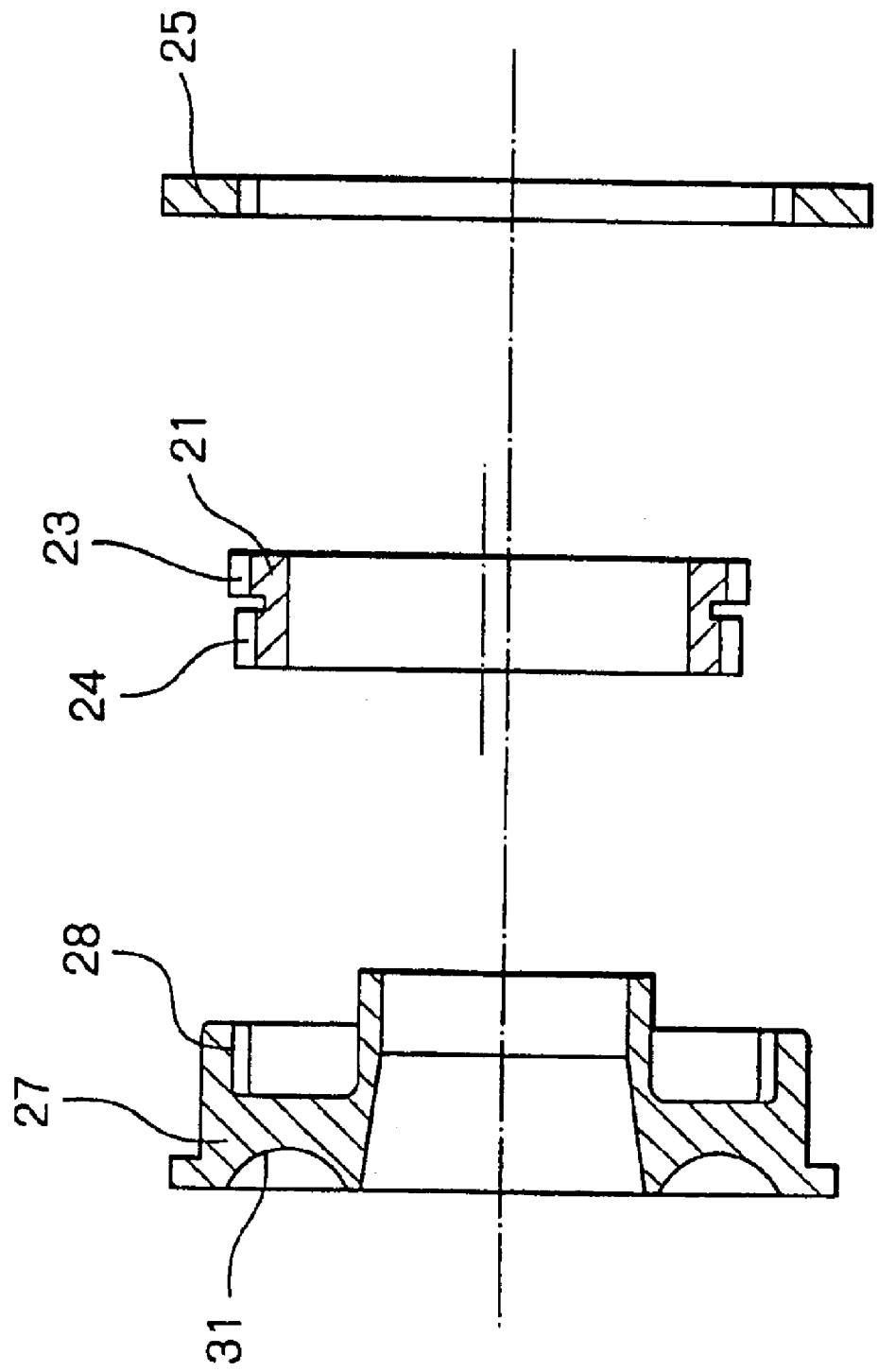
FIG. 6 is a disassembled view of a reduction mechanism of the electrically actuatable disc brake of FIG. 1.
Figure 7:
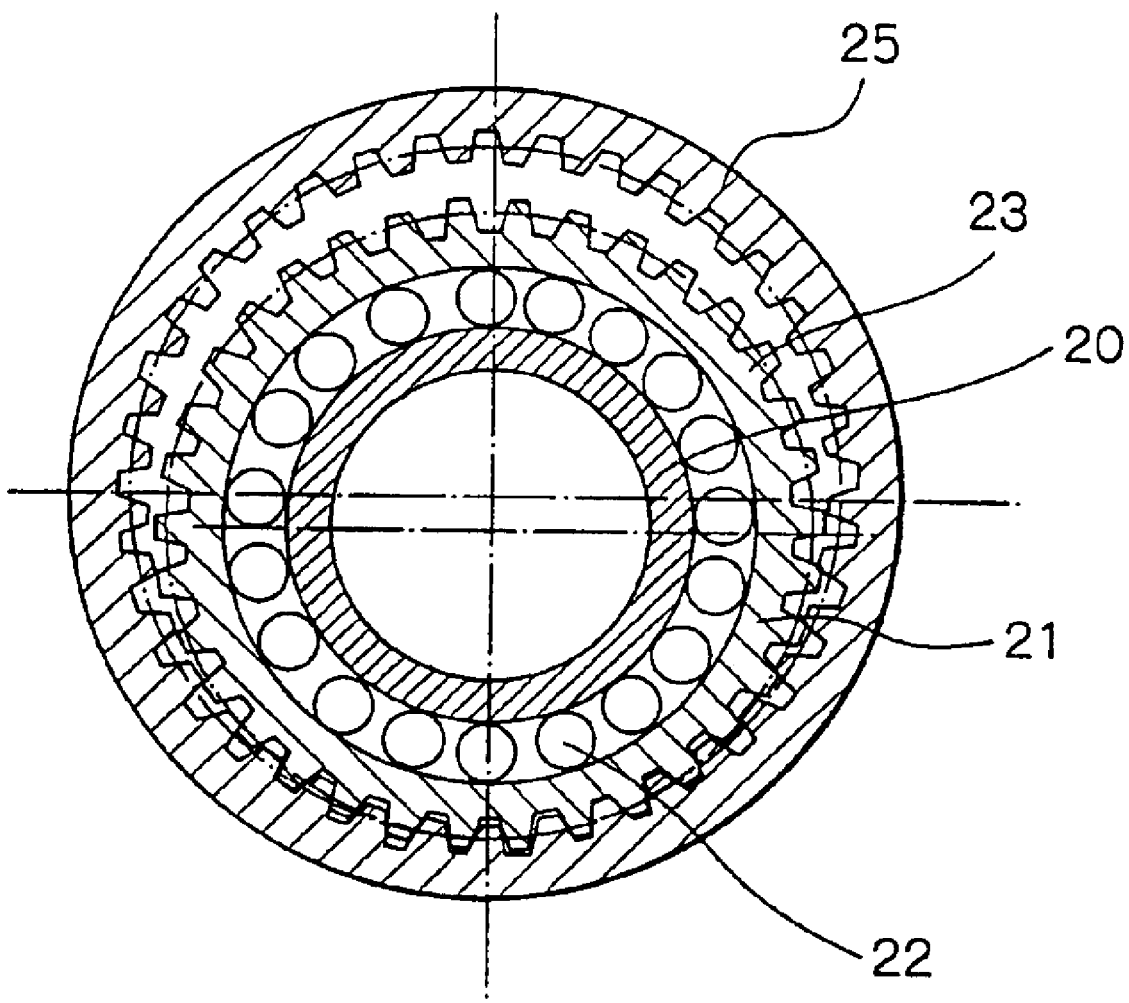
FIG. 7 is a cross-sectional view of the reduction mechanism of the electrically actuatable disc brake of FIG. 1 along a plane that is perpendicular to the axes of a set of external input teeth and a fixed ring gear.
Figure 8:
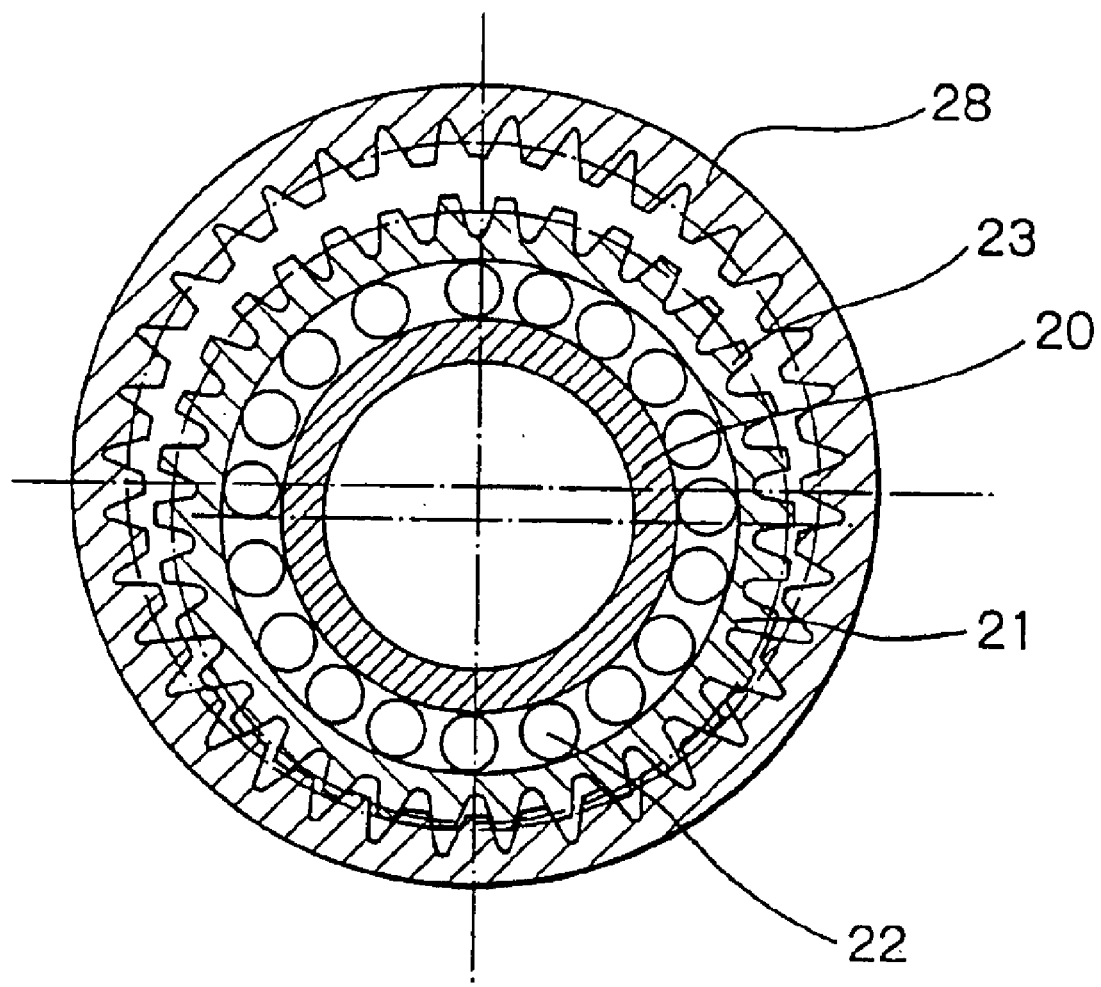
FIG. 8 is a cross-sectional view of the reduction mechanism of the electrically actuatable disc brake of FIG. 1 along a plane that is perpendicular to the axes of a set of external output teeth and a ring gear.

Next, with reference to FIGS. 6 to 8 in addition to the above-described drawings, description of the differential reduction mechanism is presented.

In the electric motor 9, an eccentric shaft 20 having a hollow structure is connected integrally to the rotor 17. A cylindrical external gear member 21 (a gear member) is rotatably attached to an outer circumferential surface of the eccentric shaft 20 through a bearing 22. A hollow space within the eccentric shaft 20 has a circular cross-section having a coaxial relationship with the eccentric shaft 20 and further extends from the eccentric shaft 20 by an axial length 1 into a body of the rotor 17. The reason for this arrangement is described later. The external gear member 21 includes a set of external input teeth 23 and a set of external output teeth 24 that are formed on opposite sides in an axial direction of the external gear member 21. A fixed ring gear 25 having internal teeth that are adapted to mesh with the external input teeth 23 of the external gear member 21 is fixed to the caliper body 3 by means of bolts 26. The external output teeth 24 mesh with internal teeth of a ring gear 28 formed integrally with a rotary disc 27 of the ball ramp mechanism 12.

It is assumed that the number of teeth of the set of external input teeth 23 of the external gear member 21 is indicated by Z1, the number of the internal teeth of the fixed ring gear 25 is indicated by Z2, the number of teeth of the set of external output teeth 24 is indicated by Z3, and the number of the internal teeth of the ring gear 28 is indicated by Z4. In this embodiment, the number Z1 of teeth of the set of external input teeth 23 and the number Z2 of internal teeth of the fixed ring gear 25 are made equal (Z1=Z2). Therefore, when the eccentric shaft 20 rotates, the set of external input teeth 23 performs an orbital motion without rotating on the center axis of the eccentric shaft 20 (FIG. 7 shows another example in which the number Z1 of teeth of the set of external input teeth 23 and the number Z2 of internal teeth of the fixed ring gear 25 are different).

The ball ramp mechanism 12 comprises the rotary disc 27, which is supported by the caliper body 3 through a bearing 29 (an axial bearing) in a manner such that the rotary disc 27 is rotatable and inhibited from performing axial movement, and a linearly driven disc 30 which is axially movably supported. Ball grooves 31 and 32 (bottom-inclined grooves) are respectively formed in the rotary disc 27 and the linearly driven disc 30 so as to face each other. Balls 33 as rolling members are provided between the ball grooves 31 and the ball grooves 32. When the rotary disc 27 rotates, the balls 33 roll within the ball grooves 31 and 32, thereby effecting the axial movement of the linearly driven disc 30 according to an angle of rotation of the rotary disc 27.

The pad wear compensation mechanism 13 comprises a limiter 34 that is provided between the rotor 17 of the electric motor 9 and the linearly driven disc 30 so as to limit relative rotation between the rotor 17 and the linearly driven disc 30 to a predetermined amount. The limiter 34 is resiliently connected through a coil spring 36 to a spring holder 35 that is connected integrally to a cylindrical portion 30a of the linearly driven disc 30. By this arrangement, torque of the rotor 17 is transmitted to the linearly driven disc 30 and, when extra gaps are generated between the brake pads 5 and 6 and the piston 11 due to wear of the brake pads 5 and 6, the linearly driven disc 30 is rotated and the piston 11 is moved forward by means of an adjustment screw 37 that is provided between the linearly driven disc 30 and the piston 11 to thereby compensate for an amount of wear of the brake pads 5 and 6.

This pad wear compensation mechanism 13 does not constitute the subject of the present invention. Therefore, further explanation of the pad wear compensation mechanism 13 is omitted.

Next, an operation of the disc brake of the present invention arranged in the above-mentioned manner will now be described.

During braking, the controller detects a driver's pedaling force that is applied to a brake pedal (or an amount of displacement of the brake pedal) through a brake pedal sensor. Based on the detected value, the controller applies a driving voltage through a driver circuit to the electric motor 9 of the electrically actuatable disc brake 1 for each wheel to thereby rotate the rotor 17 through a predetermined angle of rotation with predetermined torque. Rotation of the rotor 17 is reduced at a predetermined reduction ratio by the differential reduction mechanism 10, and the rotation of the rotor 17 is converted to a linear motion by the ball ramp mechanism 12 to thereby move the piston 11 in a forward direction. One brake pad 5 is pressed against the disc rotor 2 by the piston 11, and a reaction force acts on the caliper body 3, which in turn moves along guide portions of the carrier 7 for the slide pins 8, and the claw portion 4 presses the other brake pad 6 against the disc rotor 2. Thus, the driver can control a braking force according to a pedaling force. For releasing a braking force, the electric motor 9 is rotated reversely to thereby move the piston 11 in a rearward direction and to separate the brake pads 5 and 6 away from the disc rotor 2.

The controller detects conditions of a vehicle, such as a speed of rotation of each wheel, a vehicle velocity, a vehicle acceleration, a steering angle, a lateral acceleration of a vehicle, etc., through various types of sensors. Based on the detected values, the rotation of the electric motor 9 is controlled to thereby effect boost control, anti-lock brake control, traction control, vehicle stabilization control, etc.

When the rotor 17 rotates, in the differential reduction mechanism 10, the eccentric shaft 20 causes an eccentric rotation of the external gear member 21. In a first embodiment of the present invention, the number $Z1$ of teeth of the set of external input teeth 23 on the external gear member 21 and the number $Z2$ of the internal teeth of the fixed ring gear 25 are equal ($Z1=Z2$). Therefore, the set of external input teeth 23 and the fixed ring gear 25 operate as an Oldham mechanism, and the set of external input teeth 23, that is, the external gear member 21, performs an orbital motion without rotating on the center axis of the external gear member 21. Consequently, the set of external output teeth 24 (the number of teeth: $Z3$) also performs an orbital motion without rotating on the center axis of the ring gear 28 so as to cause rotation of the ring gear 28 (the number of teeth: $Z4$) and to operate the rotary disc 27. It should be noted herein that the hollow space within the eccentric shaft 20 further extends into the rotor by the length 1. That is, the hollow space extends to a portion 17a of the body of the rotor 17. By connecting the eccentric shaft 20 to the rotor 17, an unbalanced mass corresponding to the eccentric shaft 20 is added to the rotor 17. However, due to an extension of the hollow space into the body of the rotor 17, a mass is subtracted from the body of the rotor at its eccentric position. Therefore, the rotational balance of the rotor 17 can be achieved by adjusting a diameter $\phi d$ of the hollow space of the eccentric shaft 20.

In this embodiment, a rotation ratio N1 of the rotary disc 27 to the rotor 17 is indicated by $N1=1-Z3/Z4$, and a reduction ratio $\alpha 1$ of the differential reduction mechanism 10 is indicated by $\alpha 1=1/N1=1/(1-Z3/Z4)$. A displacement X of the linearly driven disc 30 relative to an angle $\theta$ of rotation of the rotor 17 is indicated by $X=(L/360)\times(\theta/\alpha 1)$, wherein L represents an inclination (a lead) of the ball groove of the ball ramp mechanism 12.

Thus, a desired reduction ratio can be obtained by adjusting the number of teeth of the set of external output teeth 24 and the number of internal teeth of the ring gear 28 so that a high reduction ratio can be easily obtained. Consequently, the electric motor 9 can be reduced in size and power consumption can be reduced so that the electrically actuatable disc brake 1 can thereby be reduced in size and easily mounted on a vehicle. The differential reduction mechanism 10 is formed by only a gear mechanism and thus differs from the above-mentioned conventional techniques using pins, openings, balls, etc. Therefore, the need for high machining accuracy can be reduced, and a desired strength can be easily obtained. Each gear of the differential reduction mechanism 10 can be formed by machining in a relatively easy fashion, using conventional machines, thereby leading to a low cost of manufacture. Although the relationship $Z1=Z2$ is established in this embodiment, the same effects as those of this embodiment can be exerted by making an arrangement wherein $Z1$ and $Z2$ are different from each other and $Z3$ and $Z4$ are equal, or an arrangement wherein $Z1$ and $Z2$ are different from each other and $Z3$ and $Z4$ are also different from each other.

Next, a second embodiment of the present invention will now be described. In the electrically actuatable disc brake 1 of the second embodiment, the number $Z1$ of teeth of the set of external input teeth 23 of the external gear member 21 is smaller than the number $Z2$ of the internal teeth on the fixed ring gear 25 ($Z1<Z2$), and the number $Z1$ of teeth of the set of external input teeth 23 and the number $Z3$ of teeth of the set of external output teeth 24 are equal ($Z1=Z3$). The modules of these sets of external teeth are made equal.

In the second embodiment, when the eccentric shaft 20 of the rotor 17 is subject to eccentric rotation, the external gear member 21 performs an orbital motion while rotating on its center axis. Consequently, the set of external output teeth 24 (the number of teeth: $Z3$) performs an orbital motion while rotating on the center axis of the ring gear 28, thereby rotating the ring gear 28 (the number of teeth: $Z4$) and operating the rotary disc 27.

In the second embodiment, a rotation ratio N2 of the rotary disc 27 to the rotor 17 is indicated by $N2=1-(Z2/Z1)=(Z3/Z4)=1-Z2/Z4$, and a reduction ratio $\alpha 2$ of the differential reduction mechanism 10 is indicated by $\alpha 2=1/N2=1/(1-Z2/Z4)$. The displacement X of the linearly driven disc 30 relative to the angle $\theta$ of rotation of the rotor 17 is indicated by $X=(L/360)\times(\theta/\alpha 2)$, wherein L represents the inclination (lead) of the ball groove of the ball ramp mechanism 12.

With this arrangement, the same working effects as those of the first embodiment can be obtained. Further, in the second embodiment, a reduction ratio that is higher than the reduction ratio in the first embodiment can be easily obtained. Since the set of external input teeth 23 and the set of external output teeth 24 of the external gear member 21 are made to be equal in the number of teeth and the module, the external input teeth 23 and the external output teeth 24 can be formed by gear cutting at the same time, thereby simplifying a process for machining and reducing the cost of manufacture.

In each embodiment described above, the external output teeth 24 are taken as an example of the output teeth of the external gear member 21. However, it should be understood that the present invention is not limited thereto. The output teeth may be internal teeth. In this case, the ring gear 28 is arranged as an external gear and is provided inside the gear member 21.

As has been described in detail, in an electrically actuatable disc brake according to the present invention, a reduction mechanism is formed by an eccentric shaft, a gear member comprising a set of external input teeth and a set of output teeth, a fixed ring gear and a ring gear. By this arrangement, a differential movement is created between a rotor of a motor and the ring gear, and thus, a predetermined reduction ratio is obtained. Therefore, a high reduction ratio can be easily obtained. Since the reduction mechanism is formed by only a gear mechanism, which differs from the conventional techniques using pins, openings, balls, etc., the need for high machining accuracy can be reduced, and a desired strength can be easily obtained. Further, each gear of the reduction mechanism can be formed by machining in a relatively easy fashion by using conventional finishing machines, which thereby leads to a low cost of manufacture.

In one embodiment of the electrically actuatable disc brake of the present invention, the set of output teeth comprises external teeth.

With this arrangement, the gear member has no internal teeth. Therefore, the gear member can be easily formed and imparted with a small diameter.

In another embodiment of the electrically actuatable disc brake of the present invention, the set of output teeth comprises external teeth, and the number of teeth of the set of external input teeth and the number of teeth of the set of output teeth of the gear member are made equal. Therefore, the external input teeth and the output teeth can be formed integrally with each other at the same time, which thereby leads to a low cost of manufacture.

What is claimed is:

1. An electrically actuatable disc brake comprising:
    a disc rotor;
    brake pads for engaging with said disc rotor;
    an electric motor having a rotor;
    a reduction mechanism for reducing a rotation of said rotor of said electric motor, and for generating a reduced rotation;
    a converting mechanism for converting the reduced rotation of said reduction mechanism to a linear motion, and for causing said brake pads to engage with said disc rotor so as to generate a braking force;
    wherein said reduction mechanism comprises
        an eccentric shaft connected to said rotor of said electric motor,
        a gear member rotatably attached to said eccentric shaft, said gear member including a set of external input teeth and a set of output teeth adapted to rotate unitarily with each other,
        a fixed ring gear having internal teeth adapted to mesh with said external input teeth of said gear member, and
        a ring gear adapted to mesh with said output teeth of said gear member and to operate said converting mechanism;
    wherein said eccentric shaft has a coaxial hollow space of a circular cross-section therein so that the hollow space extends into said rotor of said electric motor by a predetermined distance; and
    wherein the hollow space of said eccentric shaft extending into said rotor by the predetermined distance allows for mass added to said rotor by said eccentric shaft to be subtracted at an eccentric position of said rotor so as to achieve rotational balance for said rotor.

2. An electrically actuatable disc brake according to claim 1, wherein the number of teeth of the set of said external input teeth is equal to the number of said internal teeth of said fixed ring gear.

3. An electrically actuatable disc brake according to claim 2, wherein the set of said output teeth of said gear member comprises external teeth.

4. An electrically actuatable disc brake according to claim 3, wherein the number of teeth of the set of said external input teeth of said gear member equals the number of teeth of the set of said output teeth of said gear member.

5. An electrically actuatable disc brake according to claim 1, wherein the set of said output teeth of said gear member comprises external teeth.

6. An electrically actuatable disc brake according to claim 5, wherein the number of teeth of the set of said external input teeth of said gear member equals the number of teeth of the set of said output teeth of said gear member.

7. An electrically actuatable disc brake according to claim 1, further comprising a piston disposed so as to abut one of said brake pads.

8. An electrically actuatable disc brake according to claim 7, wherein said converting mechanism is operable to convert the reduced rotation of said reduction mechanism to a linear motion so as to effect a reciprocal movement of said piston abutting said one of said brake pads.

9. An electrically actuatable disc brake according to claim 7, further comprising a wear compensation mechanism for adjusting a position of said piston according to a degree of wear of said brake pads.

10. An electrically actuatable disc brake comprising:
    an electric motor having a rotor;
    a reduction mechanism for reducing a rotation of said rotor of said electric motor, and for generating a reduced rotation;
    a converting mechanism for converting the reduced rotation of said reduction mechanism to a linear motion to cause brake pads to engage with a disc rotor so as to generate a braking force;
    wherein said reduction mechanism comprises
        an eccentric shaft connected to said rotor of said electric motor,
        a gear member rotatably attached to said eccentric shaft, said gear member including a set of external input teeth and a set of output teeth adapted to rotate unitarily with each other,
        a fixed ring gear having internal teeth adapted to mesh with said external input teeth of said gear member, and
        a ring gear adapted to mesh with said output teeth of said gear member and to operate said converting mechanism;
    wherein said eccentric shaft has a coaxial hollow space of a circular cross-section therein so that the hollow space extends into said rotor of said electric motor by a predetermined distance; and
    wherein the hollow space of said eccentric shaft extending into said rotor by the predetermined distance allows for mass added to said rotor by said eccentric shaft to be subtracted at an eccentric position of said rotor so as to achieve rotational balance for said rotor.

11. An electrically actuatable disc brake according to claim 10, wherein the number of teeth of the set of said external input teeth is equal to the number of said internal teeth of said fixed ring gear.

12. An electrically actuatable disc brake according to claim 11, wherein the set of said output teeth of said gear member comprises external teeth.

13. An electrically actuatable disc brake according to claim 12, wherein the number of teeth of the set of said external input teeth of said gear member equals the number of teeth of the set of said output teeth of said gear member.

14. An electrically actuatable disc brake according to claim 10, wherein the set of said output teeth of said gear member comprises external teeth.

15. An electrically actuatable disc brake according to claim 14, wherein the number of teeth of the set of said external input teeth of said gear member equals the number of teeth of the set of said output teeth of said gear member.

* * * * *